United States Patent [19]

Eglowstein et al.

[11] 4,321,689

[45] Mar. 23, 1982

[54] SYSTEM FOR CONTROLLING THE DELIVERY OF DATA FROM A DATA SOURCE

[75] Inventors: Ira Eglowstein, 47 Chaumont Dr., Williamsville, N.Y. 14221; Peter E. Solender, Williamsville, N.Y.

[73] Assignee: Ira Eglowstein, Williamsville, N.Y.

[21] Appl. No.: 115,796

[22] Filed: Jan. 28, 1980

Related U.S. Application Data

[62] Division of Ser. No. 871,778, Jan. 24, 1978, Pat. No. 4,202,265.

[51] Int. Cl.³ .............................................. G06F 3/00
[52] U.S. Cl. ................................................ 364/900
[58] Field of Search ... 364/200 MS File, 900 MS File; 235/92 EA; 340/799; 355/7; 346/51

[56] References Cited

U.S. PATENT DOCUMENTS

| | | | |
|---|---|---|---|
| 2,905,930 | 9/1959 | Golden | 364/900 |
| 3,618,026 | 11/1971 | Schoenwitz | 364/900 |
| 3,941,982 | 3/1976 | Knollenberg et al. | 340/146.3 MA |
| 4,166,289 | 8/1979 | Murtha et al. | 364/200 |

*Primary Examiner*—Leo H. Boudreau
*Attorney, Agent, or Firm*—Joseph P. Gastel; Martin Lukacher

[57] ABSTRACT

Process requirements, such as high speed operations, make it necessary that a multiplicity of devices be controlled such that they perform different operations at the same time which, however, have the same effect as if the same operation is performed by all of the multiplicity of devices simultaneously. In high speed operations, for example, the printing of identification numbers and corresponding check digits, the same material must be printed in many places on each document but with printers capable only of printing each identification number of a different document at the same time as the documents are fed at high speed through the imprinting machine. A control system is described which assembles digital data representing the operations to be performed by the devices (the printed material consisting of the digits corresponding to the identification numbers which are presented by numbering machines which are incremented as the imprinter executes its successive document feeding cycles). A channel is provided for each device, which is responsive to the data and through which the data is advanced so as to operate the device in accordance therewith. A check digit printing device is operated by way of its associated channels so as to present the check digit corresponding to the identification number to be printed and enable corresponding identification numbers and check digits to be printed simultaneously at different locations on a multiplicity of different documents.

10 Claims, 4 Drawing Figures

SYSTEM FOR CONTROLLING THE DELIVERY OF DATA FROM A DATA SOURCE

This is a division of application Ser. No. 871,778 filed on Jan. 24, 1978, now U.S. Pat. No. 4,202,265.

The present invention relates to control systems for operating a multiplicity of digital data responsive devices to perform like operations in selected time sequence governed by the cyclical operation of the devices.

The invention is especially suitable for use with imprinters which print identification numbers and corresponding check digits on documents where a multiplicity of such numbers and digits are required in different locations on the same document. The invention is applicable wherever a multiplicity of digitally driven mechanisms must accept the same data and yet provide different operations in response to the data at different times, with the operations being the same with respect to an operation receiving element so as to have the same effect as if all operations were performed on that element simultaneously.

Various systems and imprinting machines have been designed for printing identification numbers and check digits on documents as they are printed on the machine or on forms which are fed through the machine. The check digits bear a certain mathematical relationship to the identification number as may be computed by weighted modulus numbering. The identification numbers and check digits may be printed so as to be read by magnet ink character recognition devices, optical character recognition devices, or in numerals understandable by the key punch operator who enters data from the document into a computerized accounting machine. In the event that the document number is incorrectly entered as may be verified by the computerized accounting machine, the data from that document is rejected by the accounting machine. Various types of machines for generating and printing identification numbers and check digits and for verifying the digits are commercially available and reference may be had to U.S. Pat. Nos. 3,650,250 issued Mar. 21, 1972 and 3,833,795 issued Sept. 3, 1974.

Conflicting requirements, as printing a multiplicity of identification numbers on the same document, while printing the documents at high speed, say hundreds of documents per minute, have retarded the development and introduction of document verification numbering into the commercial market. The document number must be printed in several locations on the document; for example, in magnetic ink in one place, and in arabic numerals which can be read by the operator in other places, say on a voucher section and official section of the same document. The identification number is generated by numbering machines usually having several number wheels mounted on a shaft with gearing between the wheels so that the numbers increment on each machine cycle. The documents are fed so that successive documents appear under the numbering machines for printing after each cycle. The check digits of the document numbers corresponding to the identification numbers are generated by a computer.

The expense of a computer militates against the use of separate computers for each of the multiplicity of document numbers required for each document. In short, it is impractical to utilize three computers in the case where three document numbers are to be printed on the same document.

Moreover, each document number although in somewhat different format, as for magnetic ink character recognition, optical character recognition, or in arabic numbers, is identical. However, the numbering machines which present the document numbers for printing occupy too much space to allow for the location of a multiplicity of such machines in registry with each document. Nevertheless, the document printing speeds desired are too high to permit movement of the document, say laterally, with respect to the numbering machines, or to allow for several passes of the documents through the machine so that different numbers can be printed in different passes. In addition, the timing of the operation of the machine which presents the identification number and check digits must be synchronous with the cyclic operation of the imprinter, otherwise the document numbers may not appear in proper registry with the documents or the numbers may be cut off in whole or in part so as to be illegible. The computer which generates the data words corresponding to the check digits and the printing machine, are independent of each other with respect to their separate operating speeds. Unless the check digit printer is operated in proper synchronism with the cyclic operation of the machine, the check digit which is printed may not correspond to the identification number. Then the document numbers will be incorrect such that upon verification, the information entered from the document will be rejected.

Accordingly, it is an object of the present invention to provide an improved system for controlling delivery of data from a data source to a plurality of data responsive devices, such as the check digit printers of a multiple document number printing machine, so that a multiplicity of operation occurs at the same time, but in different time relationship with respect to each other such that an operation receiving element such as a document, receives operations, such as the printing of document numbers, which are all alike.

It is another object of the present invention to provide an improved system for controlling the printing of document numbers which enables a multiplicity of numbers to be printed on a single document at high speed notwithstanding that the mechanisms for printing can not be located in registration with the same document at the same time.

It is a still further object of the present invention to provide an improved system for controlling a document number printer which accepts data corresponding to the check digits of the document number even though such data may be generated asynchronously by a computer independent of the document number printer.

It is a still further object of the present invention to provide an improved system for controlling a document number printer which is adapted to print a multiplicity of document numbers on each document as it is fed through the printer which makes extensive use of circuitry common to the devices which control the printing of each of the multiplicity of numbers and is of a design which is economical to manufacture.

Briefly described, a system for controlling the operation of a multiplicity of devices to perform operations repetitively with different ones of the devices performing identical operations in selected time sequence, such as the printing of a multiplicity of document numbers including identification numbers and corresponding check digits on each document of a succession of documents which are fed through a printing machine, which embodies the invention, makes use of a data source which provides sequential data words which define the operations of the devices. This data source may be a computer which outputs digital words representing the check digits corresponding to successive identification numbers which are to be printed in multiple on successive documents as they are fed through the printing machine. A multiplicity of cyclically operative means is separately associated with the devices. These means produce repetitive first timing signals for timing the operation of the one of the devices which is associated therewith, for example the check digit printer for the identification numbering machine which prints the identification number corresponding to that check digit. One of the timing signals is selected to provide a repetitive lead timing signal which is synchronous therewith and, in the case of the document numbering machine, is synchronous with the printing cycles during which successive documents are fed into registration with the numbering machine and have the document numbers printed thereon. A multiplicity of channels are each output coupled to a different one of the devices and all of the channels are input coupled to the data source. An interface unit may be provided between the data source and the channels having a first in-first out memory device which cooperates with the data source to store a succession of data words in sequential order. The data source then may operate asynchronously with respect to the printing machine under the control of the system. Each channel includes a multiplicity of registers for storing a plurality of data words in places which are located in sequential order in each register and a multiplicity of converting means which convert the data words into device operations corresponding thereto. Under the control of the lead timing signal the data words are read out of the data source or the interface unit which is coupled thereto into the registers and advanced between the stages of the registers. In the control system, addresses are generated for outputting data words which are stored in different places in the registers of different channels to the converting means for their channels. The converting means are also enabled by the timing signals for the devices which receive operating signals from the converting means. Accordingly, the devices are all operated synchronously. In the case of the printing machine where the devices are the check number printers for the check digits for each of the multiplicity of identification numbers, the check digits are set into printing position in response to the data words in synchronism with the document feeding and printing cycles of the machine. The check digits and the identification numbers are then printed in proper registry. Each of the multiplicity of numbers may be printed on a different document, spaced apart by one or more intervening documents. By virtue of the addressing, the data representing the check digits may be different data and check digits printed may be different. However, these different digits are printed on different documents and when the documents arrive at the devices for printing each of the multiplicity of identification numbers, the identification numbers will be the same. Accordingly, each document will have the same identification numbers printed in different locations thereon while the printing machine is being operated at its maximum speed.

The foregoing and other objects, features and advantages of the invention as well as a presently preferred embodiment thereof will be more apparent from a reading of the following description in connection with the accompanying drawings in which.

Figure 1:
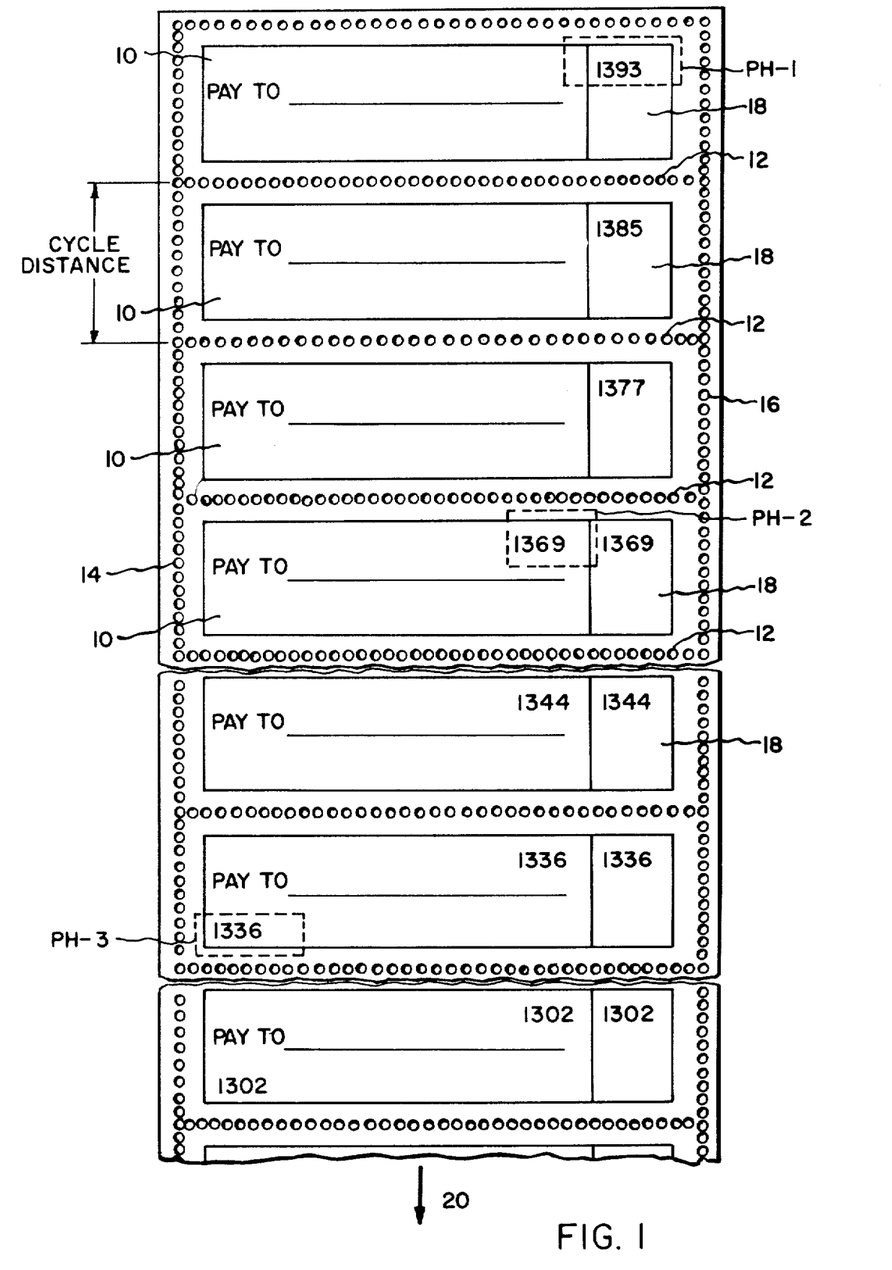
FIG. 1 is a schematic diagram illustrating the relative location of documents which are being printed on a printing machine and the printing heads which perform the printing operations when these printing heads are operated by a control system embodying the invention.

Referring more particularly to FIG. 1, there is shown a series of documents such as checks 10 which are provided successively on a continuous form. The individual checks 10 are separated by perforations 12 so that they can be torn apart from the continuous form. The form itself has drive holes 14 and 16 along its edges so that it can be driven through a computer printer which may print the payee, the amount of the check, other information on the check, and on the check stubs 18 which are associated with the check. In a document number printing machine a multiplicity of document numbers, in this case three numbers, which are identical to each other are printed on each document. In the case of checks as illustrated, one of these numbers is printed on the stubs 18 and two document numbers are printed on the checks. The numbers on the voucher and in the upper righthand corner of the check may be arabic numerals while the number in the lower lefthand corner of each check may be a magnetic ink format. In the example given, only four digits are shown. The digit in the lowest order digit position, i.e., at the righthand end of the number, is the check digit. The remaining digits constitute the identification number. While only three digits in the identification number are shown, identification numbers may have many more digits. In the illustrated example, the four highest order digits are 1101. These digits have not been shown to simplify the illustration. The identification number portions of each document number increase in value by increments of 1 and these numbers may be printed by printing heads, also referred to as numbering machines, which are discussed in more detail hereinafter in connection with FIG. 2. The check digits corresponding to these numbers are computer generated and have values depending upon the identification number which forms the document number therewith as by the weighted modulus numbering technique. The printing heads PH-1, PH-2 and PH-3 are too large to be assembled together in the space of a single check which, for example, may be only three inches in width. This three-inch distance is called the cycle distance since the checks must be fed the cycle distance to present successive checks to the printing heads.

In order to allow sufficient space for the printing heads, they are associated with every third document, and in this illustrative case are nine inches apart along the direction in which the documents are fed, which direction is indicated by the arrow 20. The imprinting of three identification numbers in three different positions on three spaced documents is carried out simultaneously in the machine which prints the document numbers. The numbering machines which print the identification numbers in the three different locations are set to print numbers three increments apart. As shown in FIG. 1, PH-1 prints the identification number 139, PH-2 prints 136, and PH-3 prints 133. Thus, when the check is fed three document cycle distances, the second print head PH-2 will have advanced to the same number as printed on the document by the first print head PH-1. This is illustrated in the drawing by the identification number 136 which was printed by PH-1 three document cycles prior to the cycle on which the check has reached the position of PH-2. Similarly, when the same check reaches the third print head PH-3, PH-3 will have advanced to the same identification number which was printed on the check by both PH-1 and PH-2. As the checks pass PH-3 they will have all three document numbers identically the same and printed thereon in different locations. High speed printing of the document numbers is thereby effected in the document number printing machine.

The printing of the check digit is under the control of the system provided by the invention.

Figure 2:
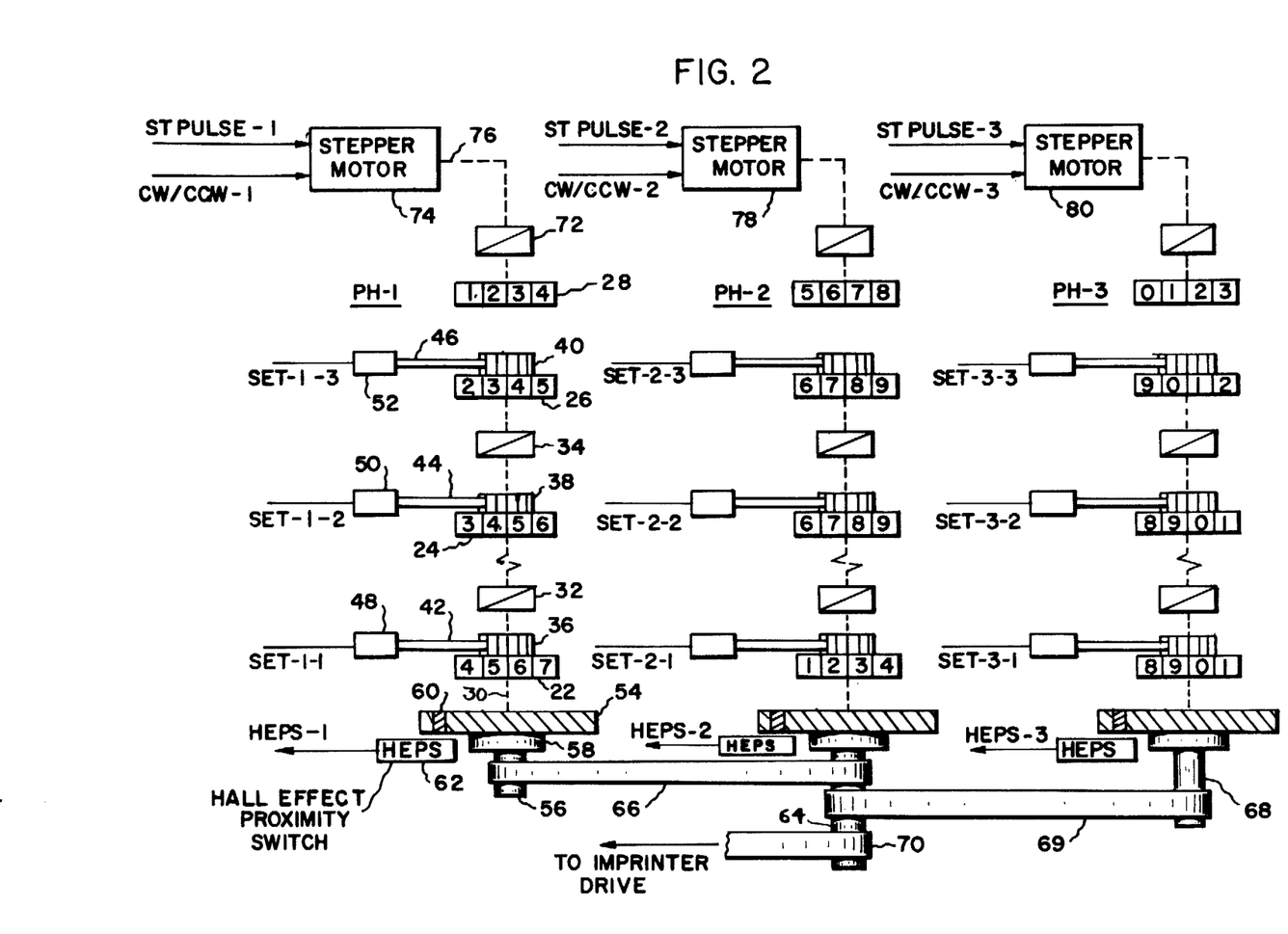
FIG. 2 is a schematic diagram illustrating three printing heads for printing document numbers including identification numbers and check digits which is adapted to operate with a control system embodying the invention.

Consider first the numbering machines for printing the identification numbers and the associated device for printing the check digits. All are contained in the same print head as shown in FIG. 2. Consider the first print head PH-1 which is typical of the three print heads. The digits of the identification number are type faces on wheels 22, 24, 26 and 28. The wheels 22, 24 and 26 are part of the numbering machine. These are mounted on the same shaft 30. Three numbering machine wheels are shown to simplify the illustration. One wheel is provided for each digit with the lower order digit wheels connected to the higher order wheels, as by ratchet and pawl mechanisms or gearing 32 and 34 so that the successively higher digits increment each time the digit of lower order thereto increments through "0". In practice it is preferable to set the digits manually with a pick. However, the individual digit wheels 22, 24 and 26 may have ratchets 36, 38 and 40 which may be engaged by pawls 42, 44 and 46. These pawls may be operated electrically by solenoids 48, 50 and 52 which may receive, from a suitable source, set pulses indicated as SET 1-1, SET 1-2 and SET 1-3 for print head PH-1. By pulsing the solenoids with the SET inputs, the ratchets may be advanced to set the digits of the identification numbers at the start of numbering operations.

The shaft 30 is also keyed to a disc 54 which may be of non-magnetic material, such as aluminum. A drive puck 56 and a station drive disc 58 are also connected to the shaft 30. The aluminum disc 54 has a magnet 60, which may be a cylindrical stub permanent magnet, embedded therein. This magnet 60 is associated with a Hall effect proximity switch 62 which produces a pulse each time the magnet 60 passes the Hall effect proximity switch. This switch is referred to as HEPS and its output pulse as HEPS-1. This output pulse serves as a timing signal in the control system.

Each of the digit wheels 22, 24, 26 and 28 prints when a hammer for the entire numbering machine (consisting of multiple wheels) is actuated or fired. The hammer fires each printing cycle. Hammer firing is mechanically tied to the station drive disc 58 rotation and as the disc 58 is adjusted, so is hammer firing time. The Hall effect proximity switches suitably provide these output signals just after the hammer fires to allow maximum time for stepper motors to actuate, which provides high speed operation. The timing pulses HEPS-1 to 3 are initiated by the passage of the magnet 60 in proximity with the Hall effect proximity switches directly after their firings, i.e., after printing. If for example, the document numbers are desired to be printed at different locations widthwise across the document (viz., in the direction of feedings 20) the digit printing wheels may be adjusted angularly with respect to the disc 54 so that the digit to be printed is presented to the hammers when the location on the check which is to receive the number is in registry therewith. The station drive disc 58 may for example be adjustable 360° so as to rotate the aluminum disc 54 and the shaft 30 with respect to the puck 56. The puck 56 and similar pucks 64 and 68 on the other print heads PH-2 and PH-3 are driven together from the imprinter drive by timing belts 66, 69 and 70. The timing belts cause the numbering wheels to increment or cycle each time the form is fed through a cycle distance, as shown in FIG. 1. This cycle distance is also the repeat length of the form since different forms present themselves repeatedly at the print heads when the print heads rotate through a cycle (360°). The print heads are therefore cyclically operated devices.

The check digit numbering wheel 28 is driven through gearing 72 by a stepper motor 74 so as to present the proper check digit for each identification number as that number increments cyclically. The stepper motor 74 is driven by stepping pulses and the rotation of the stepper motor shaft 76 and the consequent rotation of the check digit print wheel 28 is determined by the number of step pulses which are applied to the wheel each cycle of rotation of the shaft 30 (i.e., each identification number cycle). Preferably the stepper motor includes logic for steering the stepper pulses so as to rotate the shaft either clockwise or counterclockwise. Then the rate at which the check digits are advanced into printing position is accelerated. Accordingly a clockwise, counterclockwise command CW/CCW is applied together with the step pulses STPULSE to the stepper motor 74. The step pulses STPULSE for the stepper motor 74 or stepper motors 78 and 80 which drives the check digit wheels of the second and third print heads PH-2 and PH-3 are provided by the control system.

Figure 3A:
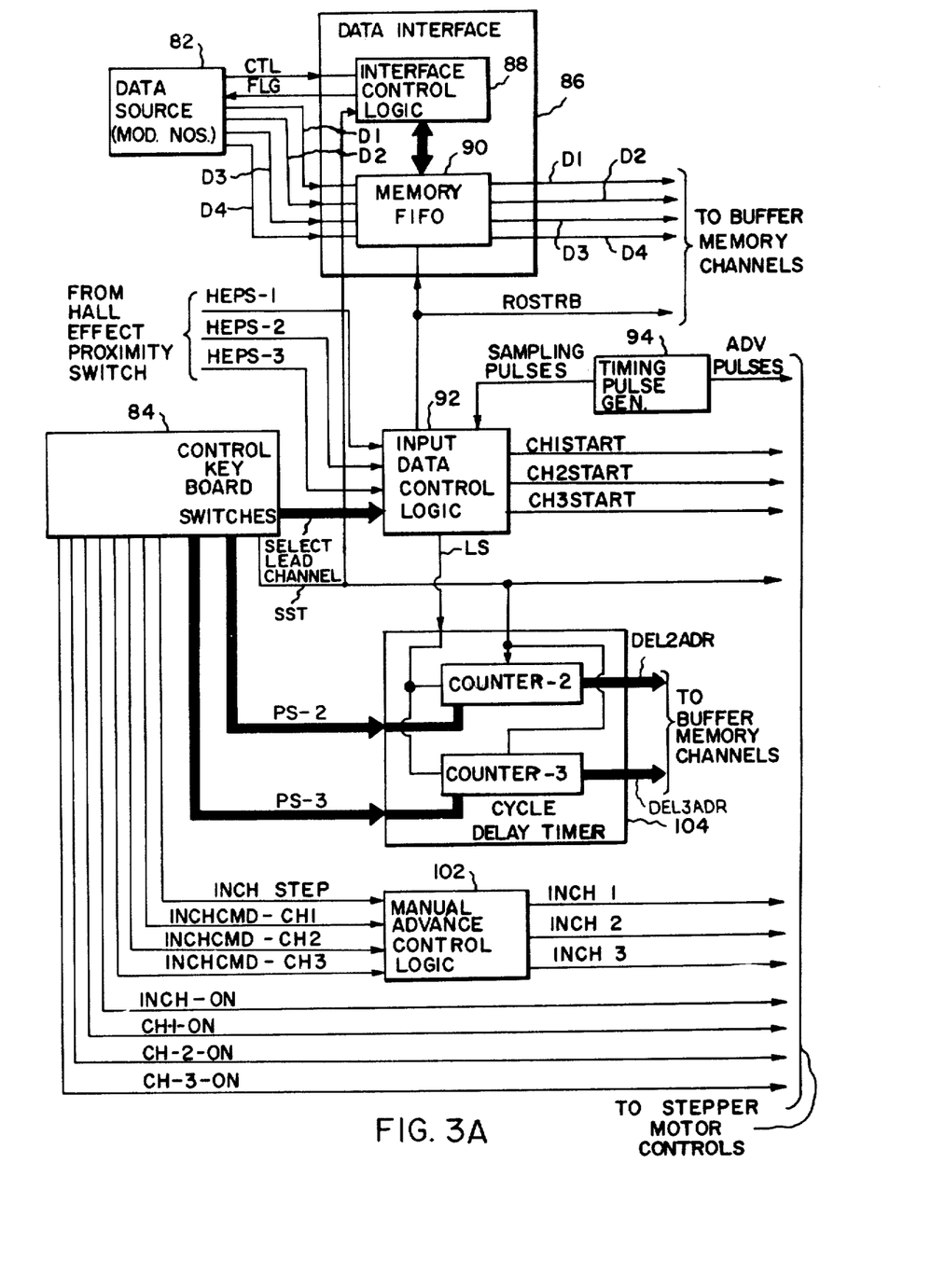
FIGS. 3A and B is a block diagram illustrating the control system in accordance with the preferred embodiment of the invention which is adapted to operate with a multiplicity of printing heads such as the three printing heads illustrated in FIG. 2.
Figure 3B:
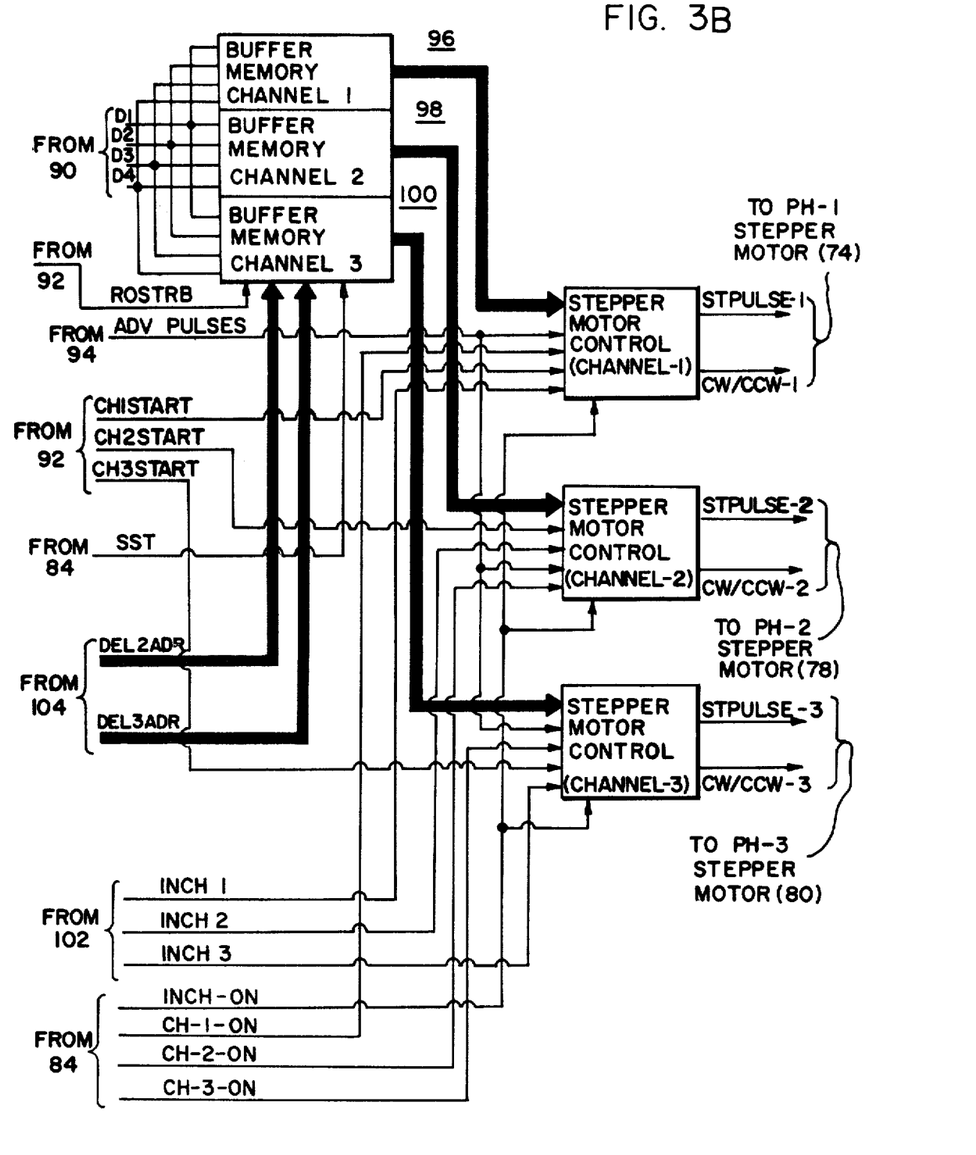

The control system is illustrated in FIG. 3. A data source 82 such as a computer, generates, as in accordance with the weighted modulus numbering technique, successive data items (four-bit digital words) on data lines D-1, D-2, D-3 and D-4 for each bit of the words. The first data word which is generated corresponds to the first identification number to which the print head which prints first is set. This first printing print head is PH-1 in the example given in FIG. 1. The data words which are generated successively after the first data word corresponds to the check digit for the next higher and then the other successively higher identification numbers. A list of identification numbers and their corresponding check digits may be printed out by a printer associated with the computer 82 so as to verify the printing of the correct document numbers when the document number printing machine is set up initially for operation. Thereafter it may be desirable to compare the document numbers with the list only infrequently, say every several hundred documents. The control system also includes a keyboard console 84 which contains control switches. All of the other components of the control system are internal thereto.

A data interface 86 having interface control logic 88 and a memory 90 for storing several, say 16 consecutive data words, is contained in the interface 86. The data lines D-1 to D-4 present the successive data words to the memory 90 when the interface control logic 86 outputs a FLG command to the computer 82 indicating that the memory 90 has received a data word and an empty position is available to receive a successive data word. When the next data word is available, the computer outputs a CTL command to the logic 88 which enables the memory 90 to accept the next data word. In this manner the memory 90, at the outset of printing operations, quickly is loaded with a sequence of data words. The memory 90 itself is desirably a first in-first out memory such as the integrated circuit device manufactured by Fairchild Semiconductor, their Part No. 9403. The memory 90 and the data interface 86 enables the computer 82 to operate asynchronously, i.e., at different times than the control system and out of synchronism with the cyclic operation of the printing machine and the printing of the document numbers.

The timing signals from the Hall effect proximity switches HEPS-1, HEPS-2 and HEPS-3 (see FIG. 2) are applied to input data control logic 92 which contains sampling and gating circuits. A timing pulse generator 94, as may contain a clock pulse oscillator and dividers, applies pulses at a sampling rate which will produce at least two complete sampling periods within the narrowest expected pulse from the HEPS lines (when the printing machine is operating at its full speed). In response to the sampling pulses the HEPS timing signals are translated into three timing pulses which are substantially free of noise. These pulses are outputted on channel start lines labeled CH1START, CH2START, and CH3START. One of the timing pulses is selected to be the lead pulse. The keyboard 84 switches include a latching switch which makes the selection and operates gates in the control logic 92. The selection commands are applied to the control logic 92 by way of select lead channel command lines from the keyboard switches 84. The term "channel" is used to denote that the lead timing signal LS which is outputted by the control logic 92 is derived from the HEPS timing signal for the one of the print heads PH-1, PH-2 or PH-3, which is operated by one of three channels 96, 98 and 100 of the control system which has been selected as the lead channel. Two lead channel timing signals are outputted by the control logic. They are timing pulses on a lead signal line LS and readout strobe pulses ROSTRB which are slightly delayed, as by one-shot logic in the control logic 92, which is denoted by the ROSTRB output line.

Each of the channels 96, 98 and 100 is associated with a different one of the print heads. Channel 1 which is identified by reference numeral 96 is associated with PH-1; channel 2 (98) with PH-2, and channel 3 (100) with PH-3. Each of the channels has the data lines D-1, D-2, D-3 and D-4 from the data interface 86 connected thereto such that the data from the memory 90 is applied simultaneously to the input of each channel. Each channel contains a buffer memory which functions as a delay buffer for the data. The buffer memory may be a shift register which is four-bits wide by sixteen words long and thus provides storage for up to sixteen words. As will become apparent as the description proceeds, each stage of the memory corresponds to a time delay of one cycle of the printing machine such that the buffer memories allow for a maximum of sixteen cycles delay. If less delay is required, memories of shorter length or not every one of the sixteen stages may be utilized.

Each of the channels also includes a stepper motor control which converts the data from the memory of its channel into a mechanical displacement of the stepper motor. The stepper motor controls respond to the four-bit data words and develop a gate of duration corresponding to the value of the word. The stepper motor control also includes a memory for storing successive data words and arithmetic logic for determining the sense of the difference between the values so as to derive a direction command for the shortest angular rotation of the stepper motor to the angular position for each data word. Instead the data words may be decoded by a decoder in the stepper motor controls to obtain the CW/CCW commands. The timing pulse generator 94 provides a stepper motor compatible rate (ADV pulses) as well as the sampling rate described previously. When the stepper motor gate is open, this compatible rate from the timing pulse generator 94 is outputted on the stepping pulse line (STPULSE) thereof. The direction command is simultaneously outputted on the CW/CCW line of the stepper motor control. The stepper motor control does not output the STPULSE pulses or the CW/CCW command until enabled by the CH1START, CH2START, or CH3START, pulse for the channel or the stepper motor which is applied to the stepper motor controls from the input data control logic 92. Each channel also receives channel ON commands CH-1-ON, CH-2-ON and CH-3-ON from the keyboard switches 84. Each channel may be selectively operated from the keyboard 84 which either provides or does not provide these channel ON commands depending upon the operation of the keyboard.

Provision is also made for manual stepping of the motors which is used during initial set-up operations. The keyboard switches include inch command switches which provide commands on an INCH STEP line and INCHCMD-CH-1, INCHCMD-CH-2, and INCHCMD-CH-3 lines. The manual control is enabled from the keyboard by activating an INCH-ON line. The inch command line for the channel to be set is then activated which operates gates in the advance control logic 102 so as to enable inch step pulses generated by an inch step keyboard switch to be outputted on one of the inch output lines from the advance control logic 102; INCH-1, INCH-2 and INCH-3. These pulses are applied directly through the stepper motor control for their channel to operate the stepper motors so as to rotate the check digit print wheels thereof to the desired digit positions.

In order to control the timing of the check digits relative to each other and enable different digits to be printed at the same time which correspond to different identification numbers and yet have all of the identification numbers and check digits on the same document come out to be the same, the buffer memories for each of the channels are separately addressed by a cycle delay timer 104. This timer for the sake of simplicity provides addresses DEL2ADR and DEL3ADR on address lines which are connected to the channel 2 and channel 3 buffer memories respectively. The channel 1 buffer memory is not addressed and the data from a predetermined stage thereof, say the first stage, is continually derived. In order to address the other channel memories, address number generating counters Counter-2 and Counter-3 in the delay timer 104 are used. These address counters indicate the stage of the shift register which is to be read out. In this implementation described, the further down the shift register string from the first stage, the more the delay with respect to channel 1. The delay is set by the operator from the keyboard at the proper time by activating digital switches PS-2 and PS-3 to the counters. The counters count the LS pulses until the switches PS-2 and PS-3 are activated by the operator. Different delays to accommodate different document widths and disposition of print heads can readily be accomplished so as to eanble flexibility of use of the document number printer with various types of documents and forms.

At the start of operation a start/set switch in the keyboard 84 is actuated and provides a start/step command SST which clears the delay timer counters and enables the FIFO memory 90 to fill with data. As mentioned above, when the system is turned on and is running, the buffer memories in the channels begin to accept data. The LS pulses clock data into the channel buffers and together with the PS commands then set the counters in the delay timer 104 and the buffer memories are addressed with the proper delay. The delay for channel 1 in this illustrative example is fixed while the operation of channel 2 and channel 3 are delayed with respect to channel 1. The addresses which correspond to these delays may be established by trial runs with the printing machine cycling at very low speed. The operator will observe the locations at which the machine prints and makes adjustments in the number of LS pulses which are counted as well as in the relative angular position of the print wheel shafts 30 with respect to the drive pucks 56, 64 and 68, as was explained in connection with FIG. 2. The first several document numbers and documents on which they are printed will not be usable. However, alignment and timing for high speed runs is effectively "proofed" and established for these runs.

In proper time relationship in each cycle of operation of the printing machine, at a time slightly delayed from the lead strobe (LS), an ROSTRB (readout strobe) pulse is outputted by the input data control logic 92. This pulse is applied to the readout input of the FIFO memory 90 in the interface 86 and to the read enable and shift inputs of the buffer memories in each of the channels 96, 98 and 100. The last data word in the FIFO memory 90 is transferred to the input of the buffer memories of the channel and the words are shifted between successive stages in the buffer memories. The output lines from the buffer memories are addressed (one set chosen for each of channel 2 and channel 3) by the delay timer 104. The stepper motor control therefore receives properly timed data words which can be printed on the staggered print heads so as to provide high speed document number inprinting.

From the foregoing description it will be apparent that there has been provided an improved control system which is especially suitable for use in controlling document number imprinting machines. The system however has application to the control of multiplicities of data responsive devices of types other than check number printers, such for example as process controllers and tools which perform successive operations on digitally controlled machine tools. Accordingly, the foregoing description should be taken merely as illustrative and not in any limiting sense.

What is claimed is:

1. A system for controlling the delivery of data from a data source to a plurality of data responsive devices which are cyclically operated which comprises
    means providing a plurality of data transferring channels each for a separate one of said plurality of data responsive devices,
    said channels each having a separate memory means which has storage for a succession of items of said data,
    means for inputting successive ones of said data items simultaneously to each of said channels once each cycle of operation of said devices, and
    control means for deriving said items from each of said memory means which are in selected positions in said successions also simultaneously once each cycle of operation of said devices and applying said simultaneously derived items simultaneously to each of said devices.

2. The invention as set forth in claim 1 wherein said inputting means comprises second memory means for receiving said data items from said data source as soon as available and storing said items in succession, and means for transferring said data items on command from said second memory means to said channels in first in, first out order.

3. The invention as set forth in claim 2 wherein said control means comprises means for providing a plurality of first control signals each repetitive synchronously with the cyclic operation of a separate one of said devices, and means for providing a lead control signal repetitive synchronously with the cyclic operation of a selected one of said devices, said transferring means being operated by said lead control signal to transfer said data items successively from said second memory means to said first memory means of said channels to store said successions of data items therein and to apply said data items from said selected positions in said first memory means to said devices, and means operated by said first control signals for enabling said data responsive devices to be operated by the data items applied thereto.

4. The invention as set forth in claim 3 including a plurality of means each corresponding to a separate one of said data responsive devices for converting each of said data items into a mechanical displacements for actuating said devices with like displacements occurring in selected order depending upon the selected position in said first memory means from which said data items are derived.

5. The invention as set forth in claim 4 wherein said data responsive devices are mechanical elements having different indicia at different locations thereon, and said converting means include stepper motors for displacing said elements to present said indicia at output positions, and means for translating said data items into sequences of pulses for operating said stepper motors to bring different ones of said indicia to said output positions.

6. A system for controlling the operation of a multiplicity of devices to perform operations repetitively with different ones of said devices performing identical operations in selected time sequence, said system comprising
    a data source providing a series of data words which define said operations,
    a multiplicity of cyclically operative means separately associated with different ones of said devices for producing repetitive first timing signals for timing the operation of the one of the multiplicity of devices associated therewith, means responsive to a selected one of said timing signals for providing a repetitive second timing signal synchronous therewith, a multiplicity of channels each having an input and an output and each being output coupled to a different one of said devices and all being input coupled to said data source, a multiplicity of registers for storing a plurality of data words in places located in sequential order therein, a multiplicity of converting means for converting each said data word into device operations corresponding thereto, each of said channels having a different one of said multiplicity of registers and a different one of said converting means therein with said converting means input coupled to said register and output coupled to a different one of said multiplicity of devices, means for addressing said registers to output words which are stored in different places in said sequential order to said converting means, means responsive to said second timing signals to input successive ones of said sequential data words from said data source simultaneously into the registers of all of said multiplicity of channels and to advance said words between successive places in said register, and means for enabling each of said converting means with the ones of said first timing signals associated with the same one of said multiplicity of devices to which said converting means in output coupled.

7. The invention as set forth in claim 6 further comprising a second memory having storage for a plurality of said data words, interface means for transferring said words from said data source into said memory such that a plurality of said series of data words is stored therein, and means responsive to said second timing signal for reading said words out of said second memory into said registers such that the words first stored in said second memory are read out sequentially therefrom into said registers.

8. The invention as set forth in claim 7 wherein said addressing means comprises a plurality of counters, means responsive to said second timing signals for entering counts in said counters corresponding to said addresses, said counters being separately connected to address inputs of different ones of said registers.

9. The invention as set forth in claim 7 wherein said devices are mechanical actuators, and said converting means are control circuit means for translating said data words into operating signals for said actuators when enabled.

10. The invention as set forth in claim 9 wherein said actuators are stepper motors, and said control circuit means include means operative to translate said data words into numbers of successive pulses and direction control signals for said stepper motors.

* * * * *